Sept. 8, 1953            J. C. LANG            2,651,231
CONNECTED FASTENER BLANK STRIP
Filed June 20, 1949
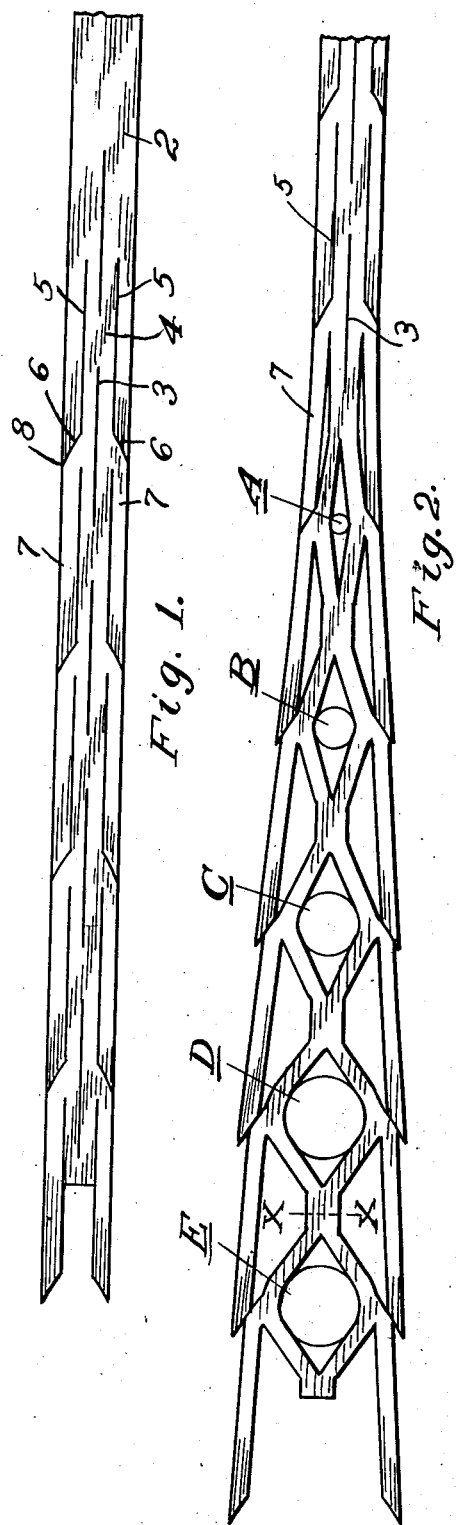
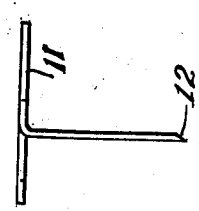
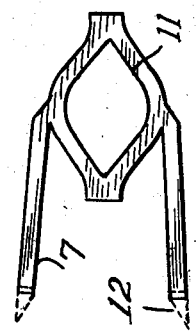
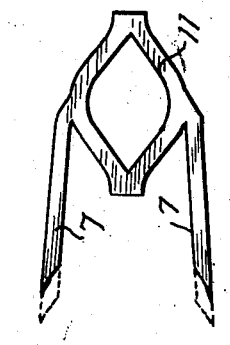
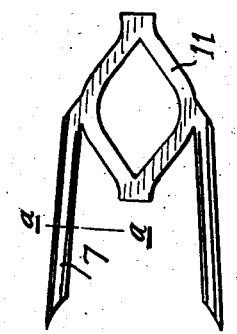
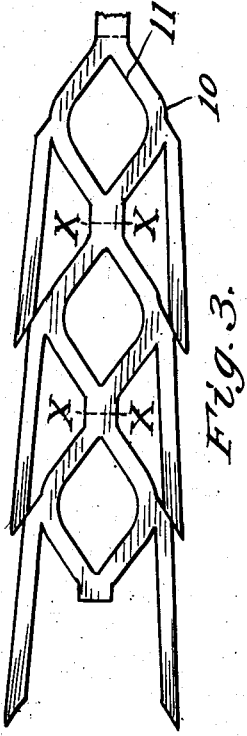
Inventor
Joseph C. Lang
By Christy, Parmelee & Strickland
Attorneys Patented Sept. 8, 1953

2,651,231

UNITED STATES PATENT OFFICE 2,651,231

CONNECTED FASTENER BLANK STRIP

Joseph C. Lang, Pittsburgh, Pa., assignor to Bocjl Corporation, Pittsburgh, Pa., a corporation of Delaware Application June 20, 1949, Serial No. 100,214

3 Claims. (Cl. 85—17)

This invention relates to driven fasteners in the form of staples, and is for a fastener of the type disclosed in my Patent No. 2,384,475, granted September 11, 1945, and for a strip of such fasteners and the method of making the same.

In my patent above mentioned, there is disclosed a fastener in the form of a staple having two legs joined to the sides of an intervening head which is in the form of a loop. The head and legs are originally formed in a common plane by slitting and expanding a narrow ribbon of metal. In use, as the legs of the fastener are driven, relative movement is effected between the legs and the head so that when the driving of the fastener is completed, the legs are perpendicular to the head, and the head presents a wide area for engaging the material through which the fastener is driven. These fasteners are sometimes referred to as "tilt-top" staples, and they are used for securing roofing paper to roofs or siding, or for securing shingles to roofs, and like operations.

In the patent above referred to, the ribbon is slit longitudinally at regular intervals down the center. Parallel slits arranged in staggered relation to the center slits are provided near each edge. These parallel slits are each connected by a cross slit, so that the center part of the metal is transversely sheared between each two of the central longitudinal slits. The strip or ribbon, after being thus slit, is progressively expanded by opening up the center slits in the manner described in said patent, particularly Figure 3 thereof. As the center of the strip is widened out, the length of the loop-forming portion decreases. In the finished expanded strip, the head-forming loops of the staples are longitudinally separated one from the other, while the leg-forming edge portions of the strip remain connected. While the staples as thus formed are highly satisfactory for their intended purpose, the blank so formed is not well adapted for use in a driving machine designed to accept and consume a continuous row of connected fasteners. It was accordingly contemplated that the strip as disclosed in Figure 3 of the aforesaid patent should be severed into individual staple blanks at the point of manufacture, and that the staples would then be packaged by cementing them together in face-to-face relation in the same manner as other preformed staples. Another difficulty with such staples, even assuming that they may be used as a connected strip of blanks, is that when so connected the heads must always have a predetermined size with reference to the length of the legs. If shorter legs were desired in the finished staple, assuming the blanks to remain connected, the loop forming the head of the staple had to be correspondingly smaller. Also, the legs or points of the staple blanks when so connected could not be formed in any section other than as flat sections.

The present invention is for an improvement over my aforesaid patent, in that the ribbon of metal, instead of being slit in the manner described in my patent, so as to form a series of blanks connected by the leg-forming elements, is now slit in such manner as to leave the head-forming elements connected to one another in the finished ribbon, while the leg-forming elements of each blank are separated from those of the preceding blank. As the head-forming loops are expanded, the shortening which takes place in the present method is compensated for by the points of the legs of each succeeding blank moving longitudinally relatively to the head of the preceding blank. In the resulting strip, therefore, the leg elements of the one blank slightly overlap the leg elements of the next blank, and the head-forming loops of the successive blanks are connected instead of being separated, as in my said patent. Since the leg-forming elements of the present blank are already shaped and pointed, the driving mechanism handling the finished strip of blanks is required only to sever the connection between the head-forming loops of successive staples, to separate one from another. The strip of blanks as thus formed enables a more compact, practical and effective form of driving mechanism to be utilized, while all of the other advantages of the fastener as originally formed are retained. Additionally, since the points of the legs of the blanks are separated from preceding blanks in the development of the ribbon, it is also practical to make the sections of the legs of some contour other than flat. Additionally it is possible to change the length of the legs without correspondingly changing the size of the head.

The object of my invention therefore is to provide a staple, staple strip and method of forming staples which is an improvement over my said patent, and which provides a connected strip of fastener blanks better adapted for use in strip form in a driving tool.

My invention may be more fully understood by reference to the accompanying drawings, in which:

Fig. 1 shows the manner of blanking out a ribbon of metal in accordance with the present invention;

Fig. 2 shows the manner of progressively expanding the blank of Fig. 1 into a series of connected fastener blanks;

Fig. 3 shows a portion of a finished length of connected fastener blanks;

Fig. 4 shows a single blank separated from the strip in which it is formed, and showing the legs shaped to provide a V-shaped section, which shape is particularly desirable for penetrating hard materials;

Fig. 4a is an enlarged transverse section through one leg of the staple of Fig. 4, the section being in substantially the plane of line a—a of Fig. 4;

Fig. 5 is a side elevation of a finished fastener showing the relation of the legs and head after relative movement through an arc of 90° has been effected between the legs and head;

Fig. 6 shows the manner in which one of the blanks of Fig. 3 may be made with shorter legs, the dotted lines representing original material which is cut away to make the legs shorter;

Fig. 7 is a view similar to Fig. 6, but showing the manner of making the blank with a chisel-pointed leg; and Fig. 8 is a side elevation of the staple shown in Fig. 7, but with the head turned 90° to the legs, this view better illustrating the chisel points which are better for nailing certain kinds of materials to certain kinds of decks.

Referring first to Fig. 1, a narrow ribbon of metal designated 2, and having the desired thickness, is progressively slit at regular intervals along its longitudinal axis with straight slits 3. Between each pair of slits 3 is a solid body of metal 4. At each side of the slits 3, and in staggered relation thereto, the ribbon of metal is slit longitudinally by slits designated 5, the slits 5 being relatively close to the edge of the strip. Each slit 5 extends from about the mid portion of one of the slits 3 to about the mid portion of the next slit 3, although actually it does not reach clear to the mid portion of either slit. The strip is also slit diagonally from one end of each slit 5 outwardly to the free edges of the strip, the diagonal slits being designated 6. The ribbon as thus slit provides along each edge of the metal a succession of leg-forming elements 7 with the free ends of the leg-forming elements being defined by the diagonal slits 6, and with sloping shoulders being formed at 8, where the end of one leg-forming element confronts the point of the next leg-forming element, and where each leg-forming element merges into that part of the blank which will ultimately be the head of the staple.

The ribbon of metal as thus slitted may be of any convenient length. As a matter of practice, it is contemplated that the ribbon of metal 2 may be of a length to form a hundred or more staple blanks.

The ribbon of metal as thus slit is then expanded as shown in Fig. 2, by progressively opening up the slits 3 by pushing force or expanders of successively larger diameter therethrough. This is shown in Fig. 2, where at station A, a force of small diameter is making the initial spread of one of the slits 3. At station B a larger diameter force is being thrust through the preceding slit; at station C still a larger force or expander is being thrust through the previously partly expanded loop; at station D the final force or expanding element is being forced through the next preceding blank, and at station E the preceding completely formed blank is shown.

As the forces or expanders of the progressively-increasing diameters are thrust into the center slits to make the loops progressively wider, it tends to shorten the overall length of the strip. This shortening causes the points of the legs 7 to slide on the inclined shoulders 8. It tends to spread the legs divergently from each loop laterally as clearly shown in Fig. 2, and the point of one staple blank slides down and overlaps the leg-forming element of the next-preceding staple. This slipping lengthwise and spreading laterally of the points of the respective blanks enables the head-forming parts of the staples to remain connected through the original part 4 of the blank, notwithstanding the shortening that then takes place.

The relative displacement of the points of successive legs of the staples as expansion occurs while the heads remain connected, may be contrasted with Fig. 3 of my Patent No. 2,384,475, where the spreading of the heads of the staples causes the head-forming portions which have been previously cut transversely to move apart longitudinally one with respect to the other. In other words, with the present invention the center-to-center distance of the connected heads decreases and the point-to-shoulder relation of successive leg-forming elements changes, whereas in my former patent the center-to-center distance of the heads remained constant as expansion occurred and the relation of the leg-forming parts did not change.

Upon completion of the expanding operation, there is produced a succession of blanks in strip form of any desired length, which blank is shown in Fig. 3. Fig. 3 shows only three connected blanks, but it will be understood that in practice there may be a great number of such blanks in a continuous ribbon. Each blank has a head-forming portion 10 having a central loop 11, and having the two legs 7 attached to the head at opposite sides of the head. Each head-forming portion is connected with the preceding one by the original strip of metal designated 4. The points of the legs of one blank are spread outwardly and overlap the shoulders of the preceding blank.

The staples as thus formed may be fed endwise into a stapling machine where the legs of each blank may, for example, be turned down perpendicularly to the head, while the blank is severed on the dotted line X—X, and after being so bent and severed, the staple can be driven. If desired, the web of metal connecting the heads may have a hole punched therein or be scored or otherwise weakened to reduce the power required to sever the metal.

As an additional operation, at some point in the blanking out of the strip of fasteners, the points of the leg-forming portions of the blank may also be rolled or stamped into a V-section as shown in Figs. 4, 4a and 5. Such non-flat or V-shaped section considerably strengthens the leg. In Figs. 4, 4a and 5, the head and legs of the staple are designated with the same numbers as the corresponding parts are in the blank previously described, but it will be noted that the leg-forming elements have been pressed to a slightly V-shape or trough shape, as best seen in Fig. 4a. In Fig. 5 the head and legs of the staple are at right angles to each other, which is the position to which these parts are turned just before or during the driving of the staple.

Referring to Fig. 6, the staple is also of the construction shown in the preceding figures, and corresponding reference numerals have been used to designate the corresponding parts, but it will be noted by comparison of the dotted and solid lines, that the legs have been shortened from their original length, and the points have been shaped to a scimitar point. In this case the part of the blank depicted in dotted lines becomes waste metal. This shaping of the points can be effected in the successive blanks during the slitting and expanding of the strip, and without requiring that the blanks be separated from one another. It will thus be seen that the invention enables a leg of any desired length to be provided in a given blank without changing the dimension of the head, and it may also be seen that the shape of the point may be either beveled or scimitar-like, or of other form, as desired.

In Fig. 7 the staple blank is also the same as previously described, and corresponding reference numerals are again used to indicate the corresponding parts. Here again, however, the original point of the staple has been cut off, and in its stead a chisel-like point 12 is provided thereon. The metal shown in dotted lines in Fig. 7 becomes waste metal in forming this point.

While I have shown by way of illustration, a preferred form of fastener and method of producing it, the invention is not limited to such specific shape and method and may be otherwise embodied within the scope of the appended claims.

I claim:

1. A connected series of fastener blanks in the form of a metal ribbon, each blank having an expanded head portion formed by slitting the metal lengthwise of the strip and stretching it crosswise of the strip into the form of a loop, diametrically opposed portions of adjacent heads being connected together along the longitudinal axis of the strip by a narrow web of metal adapted to be severed to separate the blanks, a leg connected to each side of the loop on a diameter extending transversely of the strip, the legs extending lengthwise of the strip and constituting longitudinal edges of the ribbon, the leg-forming elements of each blank having pointed ends separated from the adjoining blank.

2. A connected series of fastener blanks in the form of a metal ribbon, each blank having an expanded head portion formed by slitting the metal lengthwise of the strip and stretching it crosswise of the strip into the form of a loop, diametrically opposed portions of adjacent heads being connected together along the longitudinal axis of the strip by a narrow web of metal adapted to be severed to separate the blanks, a leg connected to each side of the loop on a diameter extending transversely of the strip, the leg-forming elements of each blank extending lengthwise of the strip and having pointed ends separated from the adjoining blanks, and the leg-forming elements diverging from the head toward the pointed ends.

3. A connected series of fastener blanks in the form of a metal ribbon, each blank having an expanded head portion formed by slitting the metal lengthwise of the strip and stretching it crosswise of the strip into the form of a loop, diametrically opposed portions of adjacent heads being connected together along the longitudinal axis of the strip by a narrow web of metal adapted to be severed to separate the blanks, a leg connected to each side of the loop on a diameter extending transversely of the strip, the leg-forming elements of each blank extending lengthwise of the strip and having pointed ends separated from the adjoining blank, the leg-forming elements diverging from the head toward the pointed ends, the pointed ends of one blank extending past and overlapping the attached ends of the leg portions of the next adjacent blank.

JOSEPH C. LANG.

References Cited in the file of this patent

UNITED STATES PATENTS

| Number | Name | Date |
| --- | --- | --- |
| 727,248 | Winters | May 5, 1903 |
| 1,614,831 | Crofoot | Jan. 18, 1927 |
| 1,727,574 | Tibbals | Sept. 10, 1929 |
| 2,072,125 | Novick | Mar. 2, 1937 |
| 2,125,211 | Vogel | July 26, 1938 |
| 2,128,443 | Vogel | Aug. 30, 1938 |
| 2,242,967 | Carlile | May 20, 1941 |
| 2,302,559 | La Place | Nov. 17, 1942 |
| 2,383,135 | Lang | Aug. 21, 1945 |
| 2,384,475 | Lang | Sept. 11, 1945 |